United States Patent Office 3,845,025
Patented Oct. 29, 1974

3,845,025
TERMINATION OF ORGANOLITHIUM INITIATED POLYMERIZATIONS WITH NITROGEN OXIDE
Henry L. Hsieh, Bartlesville, Okla., assignor to Phillips Petroleum Company
No Drawing. Filed Jan. 24, 1972, Ser. No. 220,445
Int. Cl. C08d 1/20, 3/04, 5/04
U.S. Cl. 260—84.7                    21 Claims

ABSTRACT OF THE DISCLOSURE

Organoalkali metal initiated polymerization reactions are terminated with one or more nitrogen oxides. The nitrogen oxide termination results in polymers with reduced cold flow and increased molecular weight.

FIELD OF THE INVENTION

This invention appertains to a novel method of terminating organoalkali metal initiated polymers. In another aspect, it relates to novel terminating or coupling agents for organoalkali metal initiated polymers.

DESCRIPTION OF THE PRIOR ART

The preparation of radial polymers, i.e., polymers with relatively long-chain branching, and radial and linear teleblock copolymers by means of addition of various coupling agents to a living, organolithium initiated polymer, is known. Various types of coupling or branching agents have been utilized, generally of the polyfunctional type requiring a chemical compound with several functional groups in order to provide the necessary branching or coupling. Some of the known materials are the polyesters, polyepoxides, and the like.

However, needed, still, are coupling agents of simpler type that will effectively couple, or branch, alkali metal initiated polymers.

OBJECTS OF THE INVENTION

It is an object of my invention to provide polymers with reduced cold flow. Another object of my invention is to provide polymers of improved physical properties. A further object of my invention is to improve the processing properties of polymers. A still further object is to provide a new class of polymer treating agents.

Other objects, aspects and advantages of the invention will be apparent from a study of the specification and the appended claims to the invention.

SUMMARY OF THE INVENTION

The objects described and other objects are achieved by the use of one or more nitrogen oxides or oxides of nitrogen, such as nitric oxide, NO. Nitrogen oxides react readily with the polymer-alkali metal to couple or form branched products. Nitrogen oxides are effective coupling agents, producing products with greatly reduced cold flow as compared to untreated polymers, and with broadened molecular weight distribution as indicated by an increase in the heterogeneity index. Inherent viscosity and Mooney viscosity are both distinctly increased. These factors point toward polymers of improved processability, polymers with improved milling and extrusion behavior.

DETAILED DESCRIPTION OF THE INVENTION

The invention employs one or more nitrogen oxides as the terminating or coupling agent for polymerization systems which have been initiated with alkali metal based initiators. The nitrogen oxide can be nitric oxide NO, nitrogen sesquioxide $N_2O_3$, nitrogen dioxide $NO_2$, nitrogen tetroxide $N_2O_4$, nitrogen pentoxide $N_2O_5$, or nitrogen trioxide $NO_3$, or mixtures, such as nitric oxide with nitrogen dioxide and nitrogen sesquioxide. The presently preferred nitrogen oxides, due to availability are nitric oxide and nitrogen trioxide.

The nitrogen oxide can be added to the polymerization system at any time after initiation or even after complete polymerization when the monomers have been essentially completely polymerized, or when the extent of polymerization desired has been reached. When the nitrogen oxide is added to the polymerization system during the polymerization reaction, before the monomers are essentially completely polymerized, the amount so employed should be less than that amount which would completely inactivate the polymerization initiator.

For maximum coupling the nitrogen oxide coupling agent is added at or near the end of complete polymerization of the monomers employed, and prior to termination of the reaction by use of any other terminating agent which would inactivate the polymer-alkali metal.

The amount of the nitrogen oxide employed according to my invention can range widely, such as from 100:1 to 1:100 ratio of equivalents of alkali metal employed in the initiator to equivalents of nitrogen oxide employed as the terminating agent. A presently preferred range is from 10:1 to 1:10, for efficiency and economy.

The nitrogen oxide terminating agent can be added to the system in the form of a gas, or liquid, or in the form of a solution of nitrogen oxide in an inert diluent, or in the case of appropriate nitrogen oxides as a solid. When an inert diluent is used, it can be of the same sype as that employed as the polymerization diluent (vide infra).

The nitrogen oxide can be employed under a wide range of conditions, at any temperatures or pressures employed for known alkali metal initiated polymerizations and terminations. My invention lies in a novel terminating or coupling reaction or step. For convenience, the temperature employed often will be that employed for polymerization, such as from about −10 up to 100° F. The time can be any time desired or found convenient for such termination, for example from about 5 minutes to 45 minutes. The pressure can be any pressure desired, such as autogeneous pressures.

POLYMERIZATION PROCESS

My invention is applicable to those polymerization systems initiated with alkali metal based initiators in general.

The organoalkali metal initiators can be prepared by means known to the art, such as by replacing halogens in an organic halide compound with the alkali metal or alkali metals; by direct addition of alkali metals to the double bond of an organic compound; or by reacting an organic halide with a suitable alkali metal compound. The organic radical of the organoalkali metal compound can be an aliphatic, cycloaliphatic, or aromatic radical. Typical examples include 1,4-dilithiobutane, 1,20-dilithioeicosane, 9,10-dilithioanthracene, 1,2-disodio-1,1-diphenylethane, 1,3,5-trilithiocyclohexane, n-butyllithium, paratolyllithium, and the like, including any of the alkali metals I have mentioned. Other initiators also are useful, including the alkali metal condensed ring aromatic compound adducts such as lithium-naphthalene adduct, or the adducts of lithium with anthracene or biphenyl, or 1,2-dilithio-1,2-diphenylethane, and the like. The organoalkali metal compounds presently preferred are those containing from 1 to 4 alkali metal atoms, including one or more of lithium, sodium, potassium, rubidium, and cesium, particularly those containing 1 or 2 alkali metal atoms per molecule.

The amount of initiator employed will vary depending on the polymer desired, as is well known in the art, such as an amount to provide from about 0.25 to 100 millimoles of organoalkali metal initiator per 100 grams of monomer or monomers employed.

MONOMERS EMPLOYED

The monomers which can be employed in the preparation of these terminally reactive polymers include a wide variety of materials polymerizable with alkali metal based initiators. The presently preferred monomers are the conjugated dienes containing from 4 to 12 carbon atoms per molecule. Examples of suitable conjugated dienes that can be polymerized to form terminally reactive polymers which can be terminated by the method of my invention include 1,3-butadiene, 2-methyl-1,3-butadiene (isoprene), 2,3-dimethyl-1,3-butadiene, 1,3-pentadiene (piperylene), 2-methyl-1,3-hexadiene, 2-phenyl-1,3-butadiene, 3-methyl-1,3-pentadiene, 2-phenyl-3-ethyl-1,3-butadiene, 1,3-octadiene, and the like.

In addition, conjugated dienes containing reactive substituents along the chain also can be employed, such as for example, the known polymerizable halogenated dienes, such as chloroprene, fluoroprene, etc. Of the conjugated dienes the presently preferred material is butadiene, with isoprene and piperylene also being particularly suitable.

In addition to the conjugated dienes, other monomers which can be employed, either alone or in admixture with the conjugated dienes, are compounds containing in general an active

group. Included among these latter compounds are the vinyl-substituted aromatic compounds such as those containing from 8 to 16 carbon atoms per molecule styrene, para-methoxystyrene, divinylbenzene, 3-vinyltoluene, 1-vinylnaphthalene, 2-vinylnaphthalene, 3-methylstyrene, 2-vinylanthracene, 3-vinylfluorene and the like. Other polymerizable monomers in this group include heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 3-ethyl-5-vinylpyridine, 3-methyl-5-vinylpyridine, 2-methyl-5-vinylpyridine, 3,5-diethyl-4-vinylpyridine, etc.; similar mono- and disubstituted alkenyl quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; nitriles such as acrylonitrile, and the like.

The term polymer as used herein includes not only homopolymers and random copolymers of the above materials, but also block copolymers which are formed by polymerizing a monomor onto the end of a polymer, the monomer being introduced in such a manner that substantially all of the co-reacting molecules enter the polymer chain at this point. The block copolymers can include combinations of homopolymers and copolymers of the above material hereinbefore set forth.

POLYMERIZATION CONDITIONS

The invention is not limited to any particular conditions for the polymerization step. The polymerization reaction can be carried out under conditions known to the art, including autogenous pressures. It is usually desirable to operate at pressures sufficient to maintain the monomeric material substantially in the liquid phase. The pressure thus will depend upon the particular material being polymerized, the diluent being employed, and the temperature at which polymerization is conducted. However, higher pressures can be employed if desired, these pressures being obtained by some such suitable method as the pressurization of a reactor with a gas which is inert with respect to the polymerization reaction.

Formation of the terminally reactive polymers can be carried out at any temperature known to the polymerization arts. An exemplary range is between about −100° C. and +150° C., more narrowly from −75° C. to +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired product with the other alkali metal compounds.

The polymerizations can be carried out in the presence of a suitable diluent selected from hydrocarbons, e.g., paraffins, cycloparaffins, and aromatics containing from 4 to 10 carbon atoms per molecule, such as benzene, toluene, cyclohexane, methylcyclohexane, xylene, n-butane, n-hexane, n-heptane, isooctane, and the like. It is also within the scope of my invention to employ in admixture with the hydrocarbon diluent polar compounds which do not inactivate the organoalkali metal catalyst. When employing an organolithium compound as the catalyst, it has been found that the use of polar compounds in admixture with the hydrocarbon diluent increases the reaction rate of the polymerization process. Examples of polar compounds which do not inactivate the organoalkali metal catalyst, and which may therefore be utilized with the hydrocarbon diluents, are ethers, thioethers (sulfides), and tertiary amines. Specific examples of such polar materials include dimethyl ether, diethyl ether, ethyl butyl ether, di-n-propyl ether, di-n-octyl ether, tetramethylene oxide (tetrahydrofuran), dioxane, paraldehyde, anisole, 1,2-dimethoxyethane, dibenzyl ether, diphenyl ether, dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, N,N-dimethylaniline, pyridine, quinoline, N-ethylpiperidine, N-methyl-N-ethylaniline, N-methylmorpholine, and the like. It is to be understood also that mixtures of these polar compounds can be employed in the preparation of the polymer of the conjugated dienes. When a polar compound is used in admixture with the hydrocarbon diluent, the polar compound can be in the range of 0.05 to 50 percent by weight of the total solvent mixture. The polymerization reaction can be conducted for any time sufficient to achieve the degree of polymerization desired, such as less than about 100 hours.

Subsequent to the unique termination or coupling step according to the process of my invention, the polymer then can be recovered by any suitable means known to the art, such as by admixing the polymerization reaction mixture with a suitable material to destroy any remaining active alkali metal, such as water, a lower alcohol such as isopropyl alcohol, or the like. The polymer conveniently can be recovered by coagulation of the mixture with any convenient polymer non-solvent such as isopropyl alcohol or other known materials. Various known additives can be added to this or later stages, such as antioxidants, stabilizing materials, and other additives known to the art.

EXAMPLES

Particular materials used in the following examples are intended to be illustrative only, not limitative of the extent or scope of my invention.

Example I

Nitric oxide was employed as the nitrogen oxide terminating or coupling agent in the preparation of a polymer from butadiene. The following recipe was used in the polymerization and termination as follows:

RECIPE

|  | Parts |
|---|---|
| Butadiene | 100 |
| Cyclohexane | 780 |
| n-Butyllithium | 0.08 (1.2 mmoles) |
| Temperature, ° F. | 158 |
| Time, hour | 1 |

Following polymerization, nitric oxide was added in a variable amount employing a terminating temperature of approximately 158° F., and a terminating time of approximately 20 minutes. Results obtained are as follows:

TABLE I

| Run number | NO, mmoles | Viscosity Inherent [b] | ML-4 [c] | Cold flow, mg./min. [a] | Heterogeneity index [d] |
|---|---|---|---|---|---|
| 1 | 0 | 1.40 | 7 | 137 | 1.17 |
| 2 | 0.4 | 1.84 | 32 | 0.6 | |
| 3 | 0.7 | 1.93 | 37 | 0.4 | |
| 4 | 1.0 | 1.95 | 37 | 0.3 | 1.65 |
| 5 | 1.4 | 1.90 | 36 | 0.6 | |
| 6 | 1.8 | 1.86 | 37 | 0.5 | |
| 7 | 2.2 | 1.89 | 39 | 0.4 | |

[a] Cold flow for a linear polybutadiene in 30 to 40 ML-4 Mooney viscosity range is about 30. Cold flow was measured by extruding the polymer through a ¼ inch orifice at 3.5 p.s.i. pressure and a temperature of 122° F. After allowing 10 minutes to reach steady state, the rate of extrusion was measured and the values recorded in milligrams per minute.
[b] Determined according to the procedure of U.S. 3,278,508, col. 20, notes a and b. Each polymer was gel-free.
[c] ASTM D 1646-63 Mooney viscosity at 212° F.
[d] The ratio of weight average molecular weight ($M_w$) to the number average molecular weight ($M_n$) as determined by gel permeation chromatography (GPC).

The above data show the high effectiveness of nitric oxide as a convenient and effective terminating agent producing polymers with virtually no cold flow, yet with an increased heterogeneity index indicating good processability, and with desirable molecular weights as indicated by inherent viscosity and ML-4 values.

Example II

Nitric oxide also was employed as a terminating or coupling agent in a random copolymer polymerization process. The recipe employed was as follows:

RECIPE

| | Parts by weight |
|---|---|
| Butadiene | 75 |
| Styrene | 25 |
| Cyclohexane | 780 |
| Tetrahydrofuran | 1.5 |
| n-Butyllithium | 0.08 (1.2 mmoles) |
| Temperature, °F. | 158 |
| Time, minutes | 30 |

Following polymerization of the monomers employed, nitric oxide was added in variable amount using a terminating temperature of approximately 158° F., and a terminating time of 20 minutes in each run. The following results were obtained:

TABLE II

| Run number | NO, mmoles | Viscosity Inherent | ML-4 |
|---|---|---|---|
| 8 | 0 | 1.16 | 16 |
| 9 | 0.4 | 1.46 | 38 |
| 10 | 0.7 | 1.50 | 40 |
| 11 | 1.0 | 1.53 | 44 |
| 12 | 1.4 | 1.45 | 39 |
| 13 | 1.8 | 1.45 | 41 |
| 14 | 2.2 | 1.42 | 34 |

The data show effective coupling of random copolymers as indicated by the increases in the viscosity values.

The rubbery polymers produced in accordance with my invention can be compounded by any of the known methods, such as have been used in the past for compounding natural rubber and synthetic rubbers. Vulcanizing agents, vulcanization accelerators, reinforcing agents, fillers, softeners, extenders, antioxidants, pigments and the like, such as have been employed in natural rubber and synthetic rubbers, can likewise be used in the compounds of this invention. The rubbery polymers have utility in applications where natural and synthetic rubbers are employed. For example, they can be used in the manufacture of automobile tires, gaskets, hose and other rubbery articles.

Reasonable variations and modifications of my invention are possible within the scope of the foregoing disclosure and the appended claims.

What is claimed is:

1. A polymerization process which comprises polymerizing at least one polymerizable monomer which is a polymerizable conjugate diene, polymerizable monovinyl-substituted aromatic compound, or both, under polymerization conditions with a hydrocarbon alkali metal initiator, wherein said process employs a minor effective coupling amount of at least one nitrogen oxide added to said polymerization process after initiation and prior to termination thereof,
wherein said nitrogen oxide is at least one of nitric oxide, nitrogen sesquioxide, nitrogen dioxide, nitrogen tetroxide, nitrogen pentoxide, nitrogen trioxide, or mixture.

2. The polymerization process according to claim 1 wherein said nitrogen oxide is added to said polymerization system in the form of a gas, a liquid, a solid, or in the form of a solution of said nitrogen oxide in an inert diluent, and wherein said minor effective coupling amount of said nitrogen oxide is in a range of 100:1 to 1:100 ratio equivalents of alkali metal employed in said initiator to equivalents of said nitrogen oxide employed in said polymerization system.

3. The polymerization process according to claim 2 wherein said conjugated diene contains from 4 to 12 carbon atoms per molecule, and said monovinyl-substituted aromatic compound contains 8 to 16 carbon atoms per molecule and wherein said nitrogen oxide is nitric oxide or nitrogen trioxide.

4. The polymerization process according to claim 3 wherein said nitrogen oxide is added to said polymerization process after substantially complete polymerization of said at least one monomer, and wherein said nitrogen oxide is employed at a temperature of from —10 to 100° C.

5. The polymerization process according to claim 3 wherein said polymerizing is conducted at a temperature of about —100 to +100° C., in the presence of at least one hydrocarbon diluent containing from 4 to 10 carbon atoms per molecule, and said organoalkali metal initiator is employed in an amount to provide from about 0.25 to 100 millimoles of organoalkali metal initiator per 100 grams of said at least one polymerizable monomer.

6. The polymerization process according to claim 5 which further employs a polar compound effective to increase the reaction rate of the polymerization process and does not substantially inactivate said organoalkali metal catalyst, and wherein said polar compound is employed in a range of from 0.05 to 50 weight percent based on the total admixture of hydrocarbon diluent and polar compound.

7. The polymerization process according to claim 5 wherein said polymerizable monomer is butadiene, isoprene, or styrene, and said nitrogen oxide is nitric oxide.

8. The polymers produced according to the process of claim 1.

9. A method of terminating a hydrocarbon alkali metal initiated polymerization reaction system for preparing homopolymers or copolymers of polymerizable conjugated dienes and monovinyl substituted aromatic compounds, wherein the improvement comprises adding to said polymerization reaction system after initiation thereof an effective minor terminating amount of at least one nitrogen oxide prior to complete inactivation of said hydrocarbon alkali metal initiator employed in said polymerization reaction system, and wherein said nitrogen oxide is at least one of nitric oxide or nitrogen trioxide.

10. The method according to claim 9 wherein said nitrogen oxide is added to said polymerization reaction system in an amount to provide from 100:1 to 1:100 ratio equivalents of alkali metal in said initiator:nitrogen oxide, and wherein said nitrogen oxide is nitric oxide.

11. Polymers of increased molecular weight prepared by terminating alkali metal-terminated homopolymers or copolymers of at least one polymerizable conjugated diene, polymerizable vinyl-substituted aromatic compound, or combination thereof, with a minor effective amount of nitric oxide.

12. The polymerization process according to claim 3 wherein said polymerizable conjugated diene is 1,3-butadiene, 2-methyl-1,3-butadiene, 2,3-dimethyl-1,3-butadiene, 1,3-pentadiene, 2-methyl-1,3-hexadiene, 2-phenyl-1,3-butadiene, 3-methyl-1,3-pentadiene, 2-phenyl-3-ethyl-1,3-butadiene, 1,3-octadiene; chloroprene, or fluoroprene; and said polymerizable monovinyl-substituted aromatic compound is styrene, p-methoxystyrene, 3-vinyltoluene, 1-vinylnaphthalene, 2-vinylnaphthalene, 3-methylstyrene, 2-vinylanthracene, or 3-vinylfluorene.

13. The process according to claim 6 wherein said polar compound is an ether, thioether, or tertiary amine.

14. The process according to claim 13 wherein said polar compound is dimethyl ether, diethyl ether, ethylbutyl ether, di-n-propyl ether, di-n-octyl ether, tetramethylene oxide, dioxane, paraldehyde, anisole, 1,2-dimethoxy ethane, dibenzyl ether, diphenyl ether, dimethyl sulfide, diethyl sulfide, di-n-propyl sulfide, di-n-butyl sulfide, methylethyl sulfide, dimethylethylamine, tri-n-propylamine, tri-n-butylamine, trimethylamine, triethylamine, N,N-dimethylaniline, pyridine, quinoline, N-ethyl piperidine, N-methyl-N-ethylaniline, or N-methylmorpholene.

15. The process according to claim 2 wherein said inert diluent is a hydrocarbon diluent, or hydrocarbon diluent/polar compound admixture, which does not inactivate said organoalkali metal initiator.

16. The process according to claim 5 wherein said hydrocarbon diluent is a paraffin, cycloparaffin, or aromatic hydrocarbon.

17. The process according to claim 16 wherein said hydrocarbon diluent is benzene, toluene, cyclohexane, methylcyclohexane, xylene, n-butane, n-hexane, n-heptane, or isooctane.

18. The process according to claim 5 wherein the alkali metal component of said hydrocarbon alkali metal initiator is lithium, sodium, potassium, rubidium, or cesium.

19. A polymerization process which comprises polymerizing a polymerizable monomer selected from the group consisting of butadiene, isoprene, and butadiene plus styrene, under polymerization conditions employing a hydrocarbon lithium initiator, and when said monomer is said butadiene and styrene further including the presence of a polar compound,
wherein said process employs nitric oxide in the range of 100:1 to 1:100 ratio equivalents of lithium employed in said initiator to equivalents of said nitric oxide employed in said polymerization system,
said nitric oxide is added to said polymerization process after substantially complete polymerization of said monomer, said nitrogen oxide is employed at a temperature from −10 to 100° C.,
said polymerization conditions include a temperature of about −100 to +100° C., polymerization in the presence of a hydrocarbon diluent of 4 to 10 carbon atoms per molecule, said hydrocarbon lithium initiator is employed at about 0.25 to 100 millimoles per 100 grams of polymerizable monomer, and where said polymerizable monomer is butadiene plus styrene, said polar compound is employed in a range of 0.05 to 50 weight percent based on total admixture of hydrocarbon diluent and polar compound.

20. A polymerization process which comprises polymerizing a polymerizable monomer which is butadiene, isoprene, or styrene, with n-butyllithium initiator, wherein said process employs a minor effective coupling amount of nitric oxide added to said polymerization process after initiation thereof and prior to termination thereof, wherein said amount of nitric oxide is in the range of about 100:1 to 1:100 rato equivalents of lithium in said initator to equivalents of nitric oxide,
wherein said polymerization process is conducted at a temperature of about −100 to +100° C. in the presence of a hydrocarbon diluent containing 4 to 10 carbon atoms per molecule, said n-butyllithium initiator is employed in an amount to provide about 0.25 to 100 millimoles of n-butyllithium initiator per 100 grams of said polymerizable monomer, said polymerization process further employs a polar compound effective to increase the reaction rate of polymerization process and which does not substantially inactivate said n-butyllithium initiator and said polar compound is employed in the range of 0.05 to 50 weight percent based on the total admixture of hydrocarbon diluent and polar compound.

21. A polymerization process which comprises polymerizing at least one polymerizable monomer with a hydrocarbon lithium initiator under polymerization conditions,
wherein said polymerizable monomer is a conjugated diene containing 4 to 12 carbon atoms per molecule, monovinyl-substituted aromatic compound containing 8 to 16 carbon atoms per molecule, or both,
wherein said process employs a minor effective coupling amount of nitric oxide added to said polymerization process after polymerization thereof and prior to termination thereof, said coupling amount of said nitric oxide is in the range of 100:1 to 1:100 ratio equivalents of lithium employed in said initiator to equivalents of said nitric oxide,
wherein said polymerization conditions include a temperature of about −100 to +100° C., said polymerization is conducted in the presence of hydrocarbon diluent containing 4 to 10 carbon atoms per molecule, and said hydrocarbon lithium initiator is employed in an amount sufficient to provide about 0.25 to 100 millimoles of hydrocarbon lithium initiator per 100 grams of polymerizable monomer.

References Cited
UNITED STATES PATENTS

| | | | |
|---|---|---|---|
| 3,135,716 | 6/1964 | Uraneck et al. | 260—45.5 |
| 3,322,738 | 5/1967 | Uraneck et al. | 260—85.1 X |
| 3,328,376 | 6/1967 | Bernemann et al. | 260—94.3 |
| 3,427,364 | 2/1969 | Shaw et al. | 260—879 |
| 3,468,972 | 9/1969 | Hiseh et al. | 260—94.7 N X |
| 3,506,636 | 4/1970 | Sturt et al. | 260—94.7 N X |
| 3,668,279 | 6/1972 | Loveless et al. | 260—94.7 N X |

FOREIGN PATENTS

| | | | |
|---|---|---|---|
| 992,210 | 5/1965 | Great Britain | 260—94.7 |

JOSEPH L. SCHOFER, Primary Examiner

W. F. HAMROCK, Assistant Examiner

U.S. Cl. X.R.

260—82.1, 83.1, 83.3, 83.7, 85.1, 87.5, 88.3, 84.5, 86.1, 86.7, 94.28, 92.1, 92.3, 94.6, 93.5 R and W, 94.7 N